US006286695B1

(12) United States Patent
Tetreault

(10) Patent No.: US 6,286,695 B1
(45) Date of Patent: Sep. 11, 2001

(54) ENGINE LIFTING AND POSITIONING ASSEMBLY

(75) Inventor: Bernard P. Tetreault, Grafton, NH (US)

(73) Assignee: Killick Industries LLC, Canaan, NH (US)

( * ) Notice: Subject to any disclaimer, the term of this patent is extended or adjusted under 35 U.S.C. 154(b) by 0 days.

(21) Appl. No.: 09/546,760

(22) Filed: Apr. 11, 2000

(51) Int. Cl.[7] .......... B60P 1/48

(52) U.S. Cl. .......... 212/203; 212/344; 212/901; 212/257; 254/8 R

(58) Field of Search .......... 212/901, 203, 212/235, 227, 345, 343, 257; 209/17

(56) References Cited

U.S. PATENT DOCUMENTS

| | | | | |
|---|---|---|---|---|
| 935,170 | * | 9/1909 | Smith | 212/901 |
| 1,331,938 | * | 2/1920 | McConnell et al. | 212/901 |
| 1,535,022 | | 4/1925 | Jenkins . | |
| 1,614,697 | * | 1/1927 | Snook | 212/901 |
| 2,369,816 | * | 2/1945 | Crawford | 212/225 |
| 2,375,104 | * | 5/1945 | Heitshu | 212/203 |
| 2,412,488 | | 12/1946 | Austin | 294/78 |
| 2,804,979 | * | 9/1957 | Lassiter | 212/901 |
| 3,074,562 | * | 1/1963 | Clayborne et al. | 212/901 |
| 3,751,097 | | 8/1973 | Jones et al. | 294/78 A |
| 4,099,634 | * | 7/1978 | McIntire et al. | 212/901 |
| 4,144,973 | * | 3/1979 | Reale | 212/257 |
| 4,239,196 | * | 12/1980 | Hanger | 269/17 |
| 4,588,165 | * | 5/1986 | Stellato et al. | 254/8 B |
| 4,749,324 | * | 6/1988 | Rulison | 212/265 |
| 5,051,056 | * | 9/1991 | Gibbons et al. | 414/678 |
| 5,052,566 | * | 10/1991 | Ziegler | 212/257 |
| 5,261,640 | * | 11/1993 | Yuan | 254/8 B |
| 5,375,963 | * | 12/1994 | Wohlwend | 414/685 |
| 5,862,926 | | 1/1999 | Johnson | 212/180 |
| 5,934,490 | * | 8/1999 | Mora | 212/176 |

* cited by examiner

*Primary Examiner*—Thomas J. Brahan
(74) *Attorney, Agent, or Firm*—Fish & Richardson P.C.

(57) ABSTRACT

In an aspect, the invention features a base structure and a main column vertically attached to the base structure, the main column having a mounting plate affixed above the base structure, the mounting plate adapted to attach to an engine. A rod is connected to the plate and positioned through the main column, the rod having a terminal handle opposite the plate to provide rotational movement to the plate. A boom is horizontally and pivotally attached to a top of the center beam. A trolley assembly is attached to the boom, a position of the trolley assembly along the boom controlled by a cable joined to a motor on the boom. A piston and cylinder assembly fixedly attached between the main column and boom.

23 Claims, 3 Drawing Sheets

ENGINE LIFTING AND POSITIONING ASSEMBLY

BACKGROUND

This invention relates to engine lifting and positioning assemblies.

To repair or service motor vehicles, it is often necessary to remove the engine from the engine compartment of the vehicle and to secure the removed engine so that the portion of the engine which must be repaired or rebuilt may be exposed to a mechanic. After the required work has been completed, it is then necessary to place the engine back into the vehicle, or replace it with a new engine. This can be dangerous for the mechanic due to the weight and physical imbalance characteristics of the engine.

SUMMARY

In an aspect, the invention features a base structure and a main column vertically attached to the base structure, the main column having a mounting plate affixed above the base structure, the mounting plate adapted to attach to an engine. A rod is connected to the plate and positioned through the main column, the rod having a terminal handle opposite the plate to provide rotational movement to the plate. A boom is horizontally and pivotally attached to a top of the center beam. A trolley assembly is attached to the boom, a position of the trolley assembly along the boom controlled by a cable joined to a motor on the boom. A piston and cylinder assembly is fixedly attached between the main column and boom.

Embodiments include the base structure having a base support member attached to the main column and positioned between a pair of spaced apart legs, a rear support beam joining the pair of spaced apart legs, and a pair of diverging stabilizing braces positioned between the rear support beam and the top of the center beam.

One or more of the following features may also be included: the spaced apart wheel assemblies of the rear support beam and spaced apart legs may include wheel assemblies; these wheel assemblies may be locking. Control of the pulley, motor, and piston and cylinder assembly may be combined into a single remote device.

Embodiments of the invention may have one or more of the following advantages.

An engine may be removed from or re-positioned in a vehicle without the need to move the entire lift. The engine may be raised and then slide back away from the vehicle by the action of the trolley. Once removed, the engine may be positioned and affixed safely to the plate before the lift is withdrawn from the vehicle.

The control of the entire lift can be done remotely. Further, two lifts facing each other make it efficient and easy to transfer a single engine from one lift to another.

The details of one or more embodiments of the invention are set forth in the accompanying drawings and the description below. Other features, objects, and advantages of the invention will be apparent from the description and drawings, and from the claims.

DESCRIPTION OF DRAWINGS

The foregoing features and other aspects of the invention will be described further in detail by the accompanying drawings, in which.

Like reference symbols in the various drawings indicate like elements.

DETAILED DESCRIPTION

Figure 1:
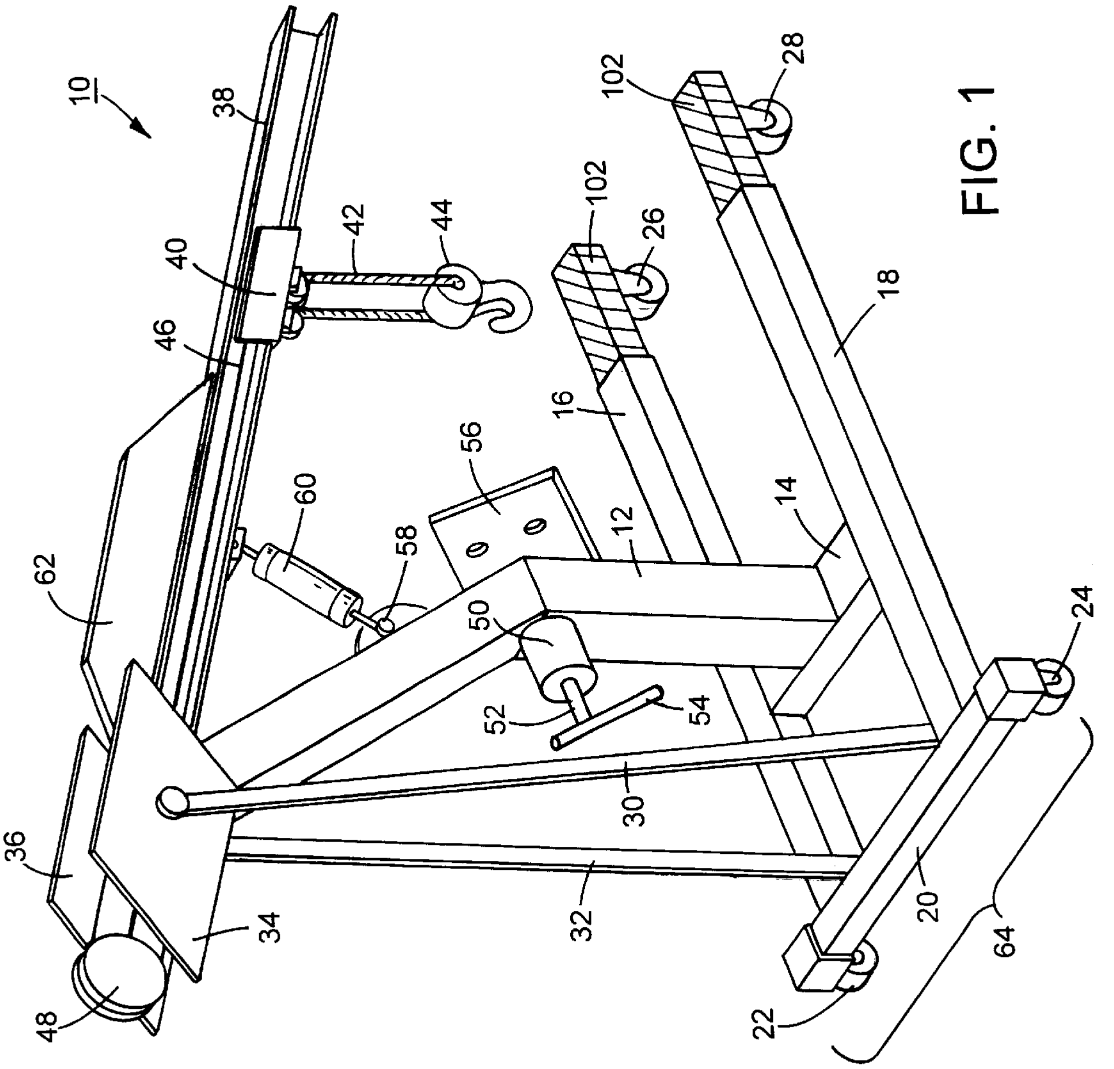
FIG. 1 is a perspective view of an engine lifting and positioning assembly.

Referring to FIG. 1, an engine lifting and positioning assembly 10 includes a main support column 12 supported by a base support member 14 positioned between and coupled to a pair of spaced apart legs 16 and 18. The spaced apart legs 16 and 18 are joined by a rear support member 20 having a set of wheel assemblies 22 and 24 at opposite ends. The legs 16 and 18 include a set of leg wheel assemblies 26 and 28. The rear support member 20 also has a pair of diverging stabilizing braces 30 and 32 that attach at their upper end to the main support column 12 via a pair of beam plates 34 and 36. A boom 38 is attached to the top of the main support column 12 via the plates 34 and 36. The boom 38 includes a trolley assembly 40 containing a pulley mechanism 42 that is attached to a hook 44. The trolley assembly 40 is slidably engaged with the boom 38 permitting the trolley assembly 40 to be positioned anywhere along the boom 38 and to be locked in place, along the boom 38. The trolley assembly 40 is attached to a cable 46 running along a length of the boom 38 and to a motor 48. The motor 48 provides bidirectional movement to the cable 46 which in turn controls movement of the trolley assembly 40.

The main support column 12 includes a central mounting channel 50. The mounting channel 50 contains a rod 52 which includes a positioning handle 54 on one end and attachment to a mounting plate 56 on its other end. The mounting plate 56 is used to fixedly attach to an engine (not shown). The main support column 12 further includes a swiveled seat 58 to connect a piston and cylinder assembly 60 to the boom 38.

The motor 48 is connected to a power source (not shown) and may contain a remote control unit (not shown) for engagement and disengagement of the motor 48 by an operator.

In an embodiment, the base support member 14, legs 16 and 18, and rear support member 20 can be combined into a single base frame 64. Main support column 12 is welded to the base frame 64. The trolley assembly 40 slides along a lower channel of the boom 38 which is an I-beam. The boom 38, main support column 20, and stabilizing braces 30 and 32 are joined between the beam plates 34 and 36 by a single bolt which allows the boom 38 to pivot up and down. The boom 38 is further stabilized by a truss 62. The rod 52 is threaded to provide stable rotational capability to the mounting plate 56. The piston and cylinder assembly 60 is hydraulic. The wheel assemblies 22, 24, 26 and 28 are locking.

Figure 2:
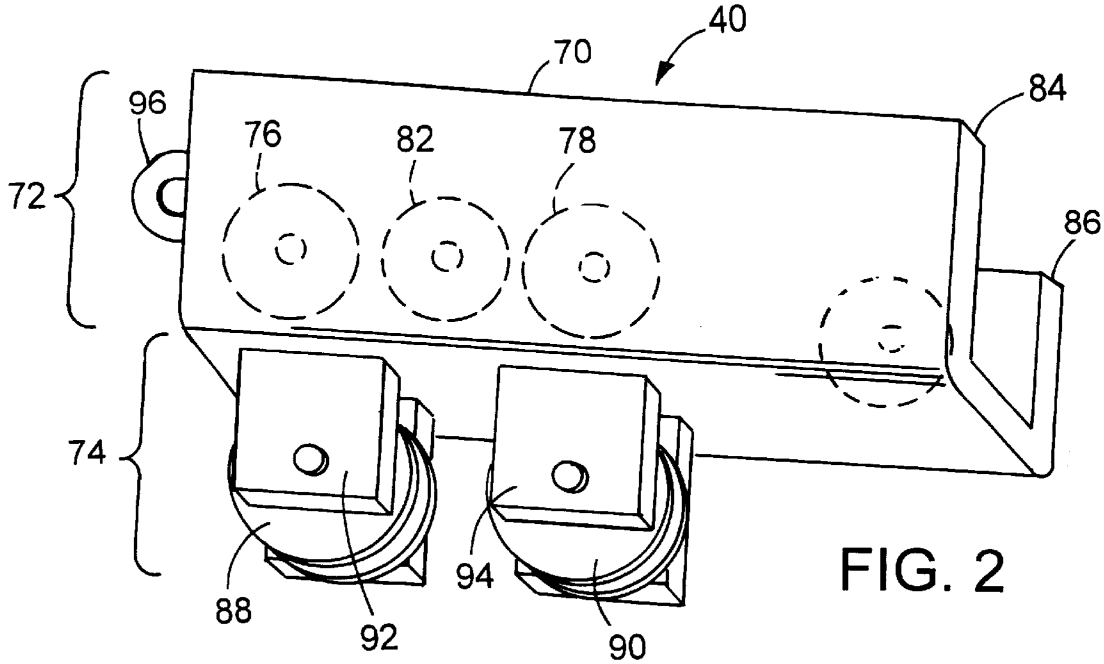
FIG. 2 is a first perspective view of a trolley assembly.

Referring to FIG. 2, the trolley assembly 40 (of FIG. 1) includes a main trolley body 70, having a trolley region 72 and a pulley region 74. The trolley region 72 includes four wheels 76, 78, 80, and 82. It is preferred that these wheels be bearings. Wheels 76 and 78, shown in tandem, are attached to the inner side of the trolley region 72 on a left vertical support 84, while wheels 80 and 82 are attached to the inner side of the trolley region 72 on a right vertical support 86. The wheels 76–82 face toward and ride on the boom 38 (of FIG. 1).

The pulley region 74 includes a pair of lower pulley wheels 88 and 90 supported by vertical support members 92 and 94, respectively.

In a particular embodiment, the trolley region 72 is formed to cup the lower end of the boom 38 and includes a cable hitch 96 to provide attachment to one end of the cable 46. The vertical support members 92 and 94 of the pulley region 74 are, e.g., steel, and are welded at a central location under the trolley region 72. The wheels 88 and 90 are locking and adapted to receive a rope or cable sufficient to handle the weight of an engine. A terminal end of the boom 38 is provided with a stop (not shown) to prevent the trolley assembly 40 from slipping off of the end of the boom 38. The four wheels 76–82 are heavy-duty type of casters.

Figure 3:
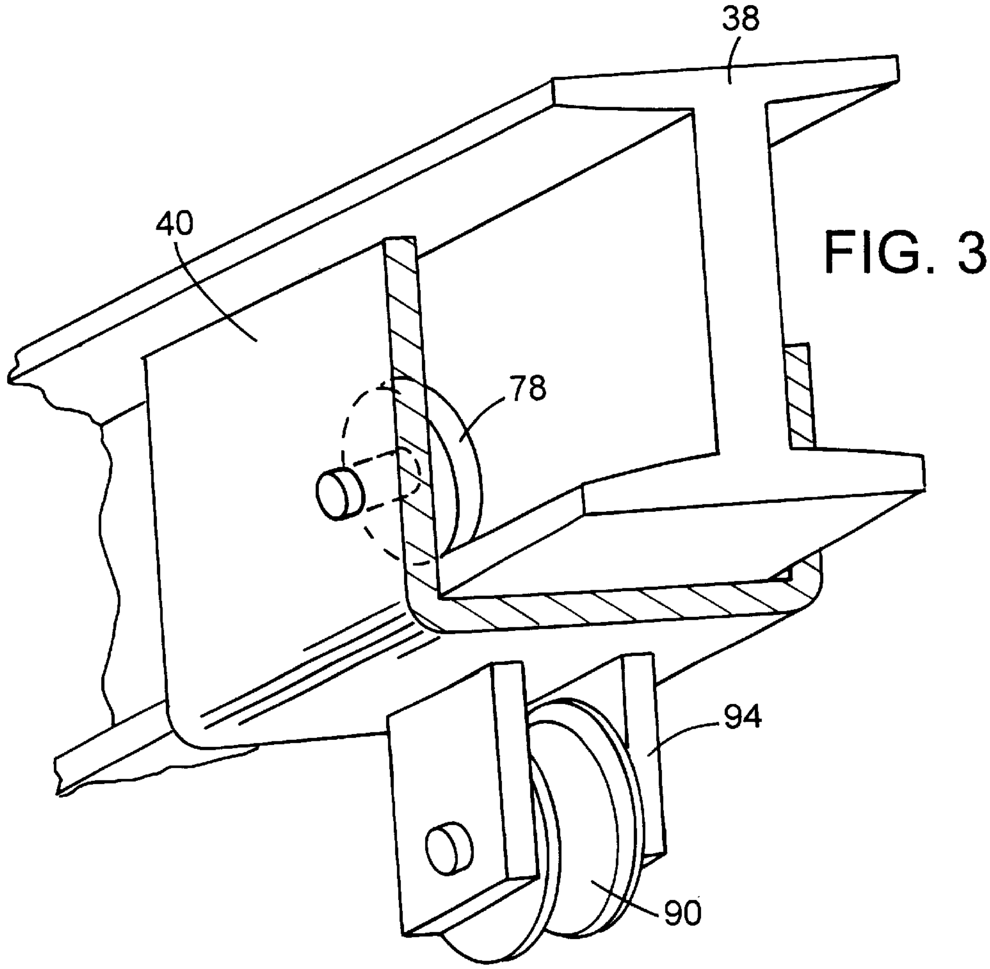
FIG. 3 is a second perspective view of the trolley assembly.

Referring to FIG. 3, the trolley assembly 40 is how adapted to a boom 38 that is formed from an I-beam to provide additional load-bearing capacity.

Figure 4:
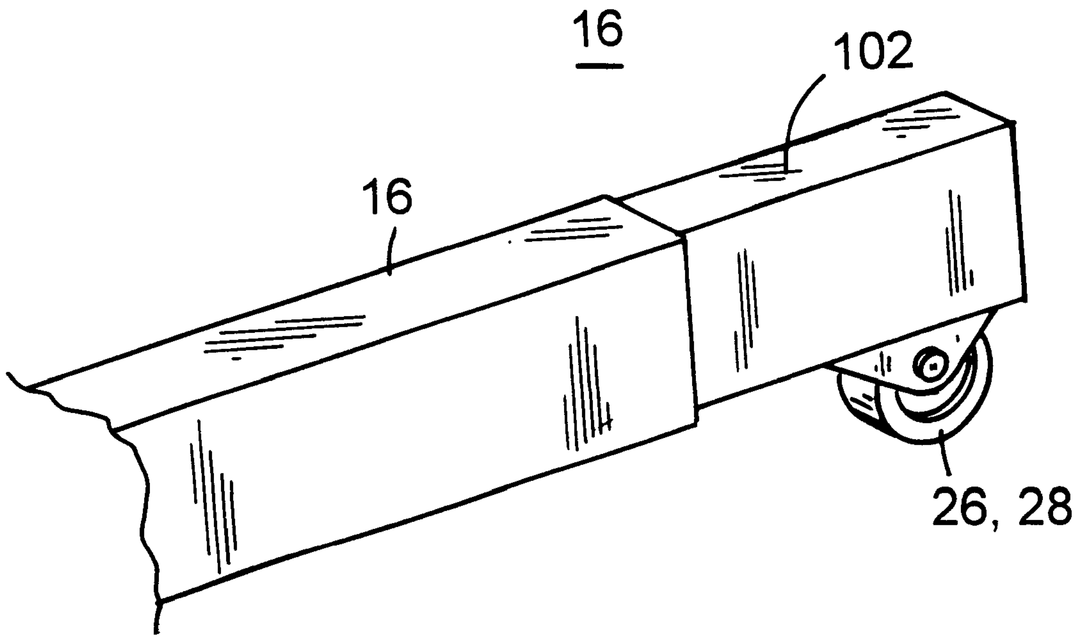
FIG. 4 is a view of an adjustable leg.

Referring now to FIG. 4, one of the legs 16 is shown to include a primary section 100 and a second section 102. The secondary section 102 is sized to fit and slide snugly into the primary section 100, and thus provide customizable overall length of the leg 16. In a particular embodiment, the second section locks into the primary section 100 to provide stability and safety.

The engine lifting and positioning assembly 10 can be used to remove and reposition engines from a variety of vehicles. In operation, engine lifting and positioning assembly 10 is rolled by the mechanic so that the spaced apart legs 16 and 18 are positioned under the vehicle and engine. The engine is supported with an appropriate strapping (not shown), which is attached to the hook 44 of the pulley mechanism 42 of the trolley assembly 40. The engine is released from the vehicle and raised out of the vehicle by a combination of the pulley mechanism 42 and the boom 38 lifted via the piston and cylinder assembly 60. Once the engine has cleared the vehicle, the trolley assembly 40 is drawn via the cable 46 by the motor 48 toward the main support column 12. The engine may then be lowered and attached to the mounting plate 56. The engine lifting and positioning assembly 10 is then rolled back away from the vehicle. Installation of the engine into the vehicle is the reverse of the removal process.

Many additional embodiments are possible, For example, control of the trolley assembly 40, pulley mechanism 42, and the piston and cylinder assembly 60 may be individual via several remote controls, or combined into one master remote control device. Moreover, a second engine lifting and positioning assembly can be positioned in front of the first engine lifting and positioning assembly, thereby facilitating the transfer of one engine from the first engine lifting and positioning assembly to the second engine lifting and positioning assembly, and back.

Other embodiments are within the following claims.

What is claimed is:

1. An engine lift comprising:

a base structure;

a main column vertically attached to the base structure, the main column having a mounting plate affixed above the base structure, the mounting plate adapted to attach to an engine;

a rod connected to the plate and positioned through the main column, the rod having a terminal handle opposite the plate to provide rotational movement to the plate;

a boom horizontally and pivotally attached to a top of the main column a trolley assembly attached to the boom, a position of the trolley assembly along the boom controlled by a cable joined to a motor on the boom; and a piston and cylinder assembly fixedly attached via swivel-seat connections between the main column and boom.

2. The engine lift of claim 1 wherein the base structure comprises:

a base support member attached to the main column and positioned between a pair of spaced apart legs;

a rear support member joining the pair of spaced apart legs; and a pair of diverging stabilizing braces positioned between the rear support member and the top of the main column.

3. The engine lift of claim 2 wherein each of the pair of spaced apart legs includes a wheel assembly.

4. The engine lift of claim 3 wherein the wheel assembly includes a locking castor-type wheel.

5. The engine lift of claim 2 wherein the rear support member includes a pair of wheel assemblies located at opposed ends of the rear support member.

6. The engine lift of claim 5 wherein each of the wheel assemblies include a locking castor-type wheel.

7. The engine lift of claim 2 wherein each of the spaced apart legs comprise:

a first section; and a second section containing the wheel assembly, the second section adapted to slide within the first section.

8. The engine lift of claim 7 wherein the first section locks into the second section.

9. The engine lift of claim 1 wherein the piston and cylinder assembly includes a hydraulic cylinder.

10. The engine lift of claim 1 wherein the trolley assembly comprises a main trolley body having an trolley region and a pulley region.

11. The engine lift of claim 10 wherein the trolley region comprises:

a left vertical support having a set of wheels facing the boom; and a right vertical support having a set of wheel facing the boom.

12. The engine lift of claim 10 wherein the pulley region comprises:

a pair of pulleys suspended between a left and right support member, each of the pulleys adapted to receive a cable and hook assembly.

13. The engine lift of claim 12 wherein the pulleys are remotely controlled.

14. The engine lift of claim 12 wherein the motor, piston and cylinder assembly, and pulleys are controlled by a single controller.

15. The engine lift of claim 10 wherein the main trolley body includes and attachment fixture for connection to the cable.

16. The engine lift of claim 1 wherein the motor is electric.

17. The engine lift of claim 1 wherein the motor is remotely controlled.

18. The engine lift of claim 1 wherein the piston and cylinder assembly is remotely controlled.

19. The engine lift of claim 1 wherein the rod is threaded.

20. The engine lift of claim 1 wherein the rod includes an adjustable lock to prevent rotation of the plate.

21. An engine lift comprising:

a base structure;

a main column vertically attached to the base structure, the main column having a mounting plate affixed above the base structure, the mounting plate adapted to attach to an engine;

a rod connected to the plate, the rod having a terminal handle opposite the plate to provide rotational movement to the plate said rod positioned through the main column;

a boom horizontally and pivotally attached to a top of the main column;

a trolley assembly attached to the boom, a position of the trolley assembly along the boom controlled by a cable joined to a motor on the boom;

a piston and cylinder assembly fixedly attached via swivel-seat connections between the main column and boom; and a master control device.

22. The engine lift of claim 21 wherein the master control device is a remote control device.

23. The engine lift of claim 21 wherein the master control device controls the motor and the piston and cylinder assembly.

* * * * *